(12) United States Patent
Ratna et al.

(10) Patent No.: US 6,576,156 B1
(45) Date of Patent: Jun. 10, 2003

(54) PHOSPHORS WITH NANOSCALE GRAIN SIZES AND METHODS FOR PREPARING THE SAME

(75) Inventors: Banahalli R. Ratna, Woodbridge, VA (US); Anthony Dinsmore, Alexandria, VA (US); Yongchi Tian, Princeton, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/398,947

(22) Filed: Aug. 25, 1999

(51) Int. Cl.$^7$ ............................................... C09K 11/59
(52) U.S. Cl. ........................... 252/301.4 R; 352/301.6 F
(58) Field of Search ................... 202/301.4 F, 301.4 R, 202/301.6 F

(56) References Cited

U.S. PATENT DOCUMENTS

| | | | | |
|---|---|---|---|---|
| 3,503,894 A | * | 3/1970 | Wachtel | 252/301.4 F |
| 5,413,736 A | * | 5/1995 | Nishisu et al. | 252/301.4 R |
| 5,472,636 A | * | 12/1995 | Forster et al. | 252/301.4 F |
| 5,611,961 A | * | 3/1997 | Forster et al. | 252/301.6 F |
| 5,637,258 A | * | 6/1997 | Goldburt et al. | 252/301.4 F |
| 5,893,999 A | * | 4/1999 | Tamatani et al. | 252/301.4 R |
| 5,985,176 A | * | 11/1999 | Rao | 252/301.6 F |
| 6,036,886 A | * | 3/2000 | Chhabra et al. | 252/301.4 R |
| 6,042,747 A | * | 3/2000 | Rao | 252/301.4 R |

* cited by examiner

Primary Examiner—C. Melissa Koslow
(74) Attorney, Agent, or Firm—John J. Karasek; George A. Kap

(57) ABSTRACT

Phosphor nanoscale powder is prepared by forming a solution or slurry which comprises phosphor precursors and then firing the solid residue of the solution or slurry which comprises the phosphor precursors.

5 Claims, 2 Drawing Sheets

PHOSPHORS WITH NANOSCALE GRAIN SIZES AND METHODS FOR PREPARING THE SAME

BACKGROUND OF THE INVENTION

1. Field of the Invention

The present invention relates to nanocrystalline phosphors. The present invention also relates to a method for preparing such phosphors and devices which contain such phosphors.

2. Description of the Background

High performance cathodoluminescence (CL) phosphors capable of working at low beam voltages have been an objective for field emitter displays (FED). Since FEDs operate at low voltages (<5 kV) under high vacuum (<$10^{-7}$ Torr), it requires phosphors which emit enough light perceivable by human eyes (>300 cd/$m^2$) and are stable under electron bombardment under high vacuum (low outgassing). A review of cathodoluminescence is provided in L. Ozawa, *Cathodoluminescence, Theory and Applications*, VCH Publishers, New York, 1990, which is incorporated herein by reference in its entirety.

Existing commercial phosphors, however, are powders with a grain size of a few micrometers which do not meet the requirements for effective use in FEDs. The power efficiency of a phosphor is largely dependent on its effectiveness of materials. In other words, a phosphor will be inefficient if its grains contain a "dead portion." Although the causes of dead portions are yet to be clarified, lattice defects, de-activating impurities, and locally charged sites are thought to be responsible. The dead portion effect becomes especially significant in low voltage electron excitation (beam voltage <1,000 V).

Most phosphors possess activators (or dopants) embedded in a wide band gap semiconductor matrix (or host). The physical mechanisms behind cathodoluminescence are various and remain, at least partly, controversial. Basically, the luminescence results from electron relaxation from an excited level to a ground level within an activator through a highly localized transition path, or from charge carrier recombination following an excitation-created charge separation (the formation of exciton). The latter mechanism is believed to be less localized and hence to be easily perturbed by impurities or other alien quenchers. The matrix crystals, serving as operating media, are required to provide "good" environment for the transitions to happen without dissipation. It has been thought that the presence of perfect crystals of the host would decrease the dead portion effect. Efforts have been, in turn, made toward making phosphor grains in the form of perfect crystals.

The processes adopted so far in phosphor fabrication are "mixing-and-firing" routes based on solid state reactions. The extent to which the reactions are completed is determined by two vital steps: the homogeneous distribution of the solid precursors and the extent of fusion. Since almost all the solid state reactions involved, such as Mn—Zn—Si combination and Ce—Y—Si combination, are slow, the quality of the end productsis governed by efficient and complete incorporation of the dopant at certain concentration levels used in the phosphors. Additionally, the firing-led fusion occurs only between the adjacent partners, and the precursor particles brought together during the "mixing." Any inhomogeneity of the "mixing" results in inefficient matrix formation as well as nonuniform incorporation of the fluorescence centers (dopants) in the matrix. Inefficient fusion leads to the formation of a dead portion even after firing. The dead portion, in this context, includes "dummy parts" of the materials which contain no dopants and in turn yield no light output, and jammed parts of the materials which are overpopulated by the dopants and therefore detrimental to the output light by internal quenching.

Nanocrystals (usually with size of a few nanometers), grown primarily in a quick solution reaction, are defect-free and well-defined chemical entities. Efforts have been invested by Rameshwar N. Bhargava et al (U.S. Pat. No. 5,637,258) in preparing nanosized phosphors of doped-zinc sulfide and yttrium oxides. The resulting phosphors have, in fact, an efficiency which is much lower than for the micron sized samples.

Thus, there remains a need for phosphors which do not contain any dead portions and which exhibit a high efficiency. There also remains a need for a method for preparing such phosphors and for devices which contain such phosphors.

SUMMARY OF THE INVENTION

Accordingly, it is one object of the present invention to provide novel phosphors.

It is another object of the present invention to provide novel phosphors which contain few or no dead portions.

It is another object of the present invention to provide novel phosphors which exhibit high efficiency.

It is another object of the present invention to provide novel nanosized phosphors which contain few or no dead portions.

It is another object of the present invention to provide novel nanosized phosphors which exhibit a high efficiency.

It is another object of the present invention to provide novel methods for preparing such phosphors.

It is another object of the present invention to provide novel devices which contain such phosphors.

These and other objects, which will become apparent during the following detailed description, have been achieved by the inventors' discovery that a method which involves:

(1) forming a solution or slurry which contains nano-sized particles of the phosphor precursors (2) eliminating the liquid medium in the solution or slurry by heating to an appropriate temperature, preferably slightly above the boiling point of the medium, to obtain a solid residue; and (3) firing the solid residue, provides phosphors which exhibit an improved efficiency.

In a particularly preferred embodiment of the present method, a first precursor which contains metal-ion-doped metal oxide particles having a greatest dimension of 500 nm or less, preferably 1 to 300 nm, more preferably 2 to 10 nm, in alcosol form is mixed with a second precursor, e.g., containing silica ($SiO_2$) having a greatest dimension of 500 nm or less, preferably 1 to 300 nm, more preferably 2 to 10 nm and the resulting mixture is sonicated, followed by the calcination of the resulting gel.

Another preferred embodiment of the present method includes the following steps:

(1) forming a suspension, as the first precursor, of a metal-ion-doped or a metal-ion-attached nanosized particles, i.e., nanoparticles whose surfaces are linked, chemically or physically, to dopant metal ions;

(2) forming a suspension of a metal-ion-doped or metal-ion-attached nanosized silica particles;

(3) mixing the suspension of nano-sized particles of a first precursor with the suspension of nano-sized particles of silica, to obtain a homogeneous gel containing said first precursor and silica;

(4) sonicating the homogeneous gel containing the first precursor and silica, to obtain a sonicated gel;

(5) drying the homogeneous gel containing the first precursor and silica, to obtain a residue;

(6) adding a flux material to said residue, to obtain a mixed powder; and (7) firing the mixed powder.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
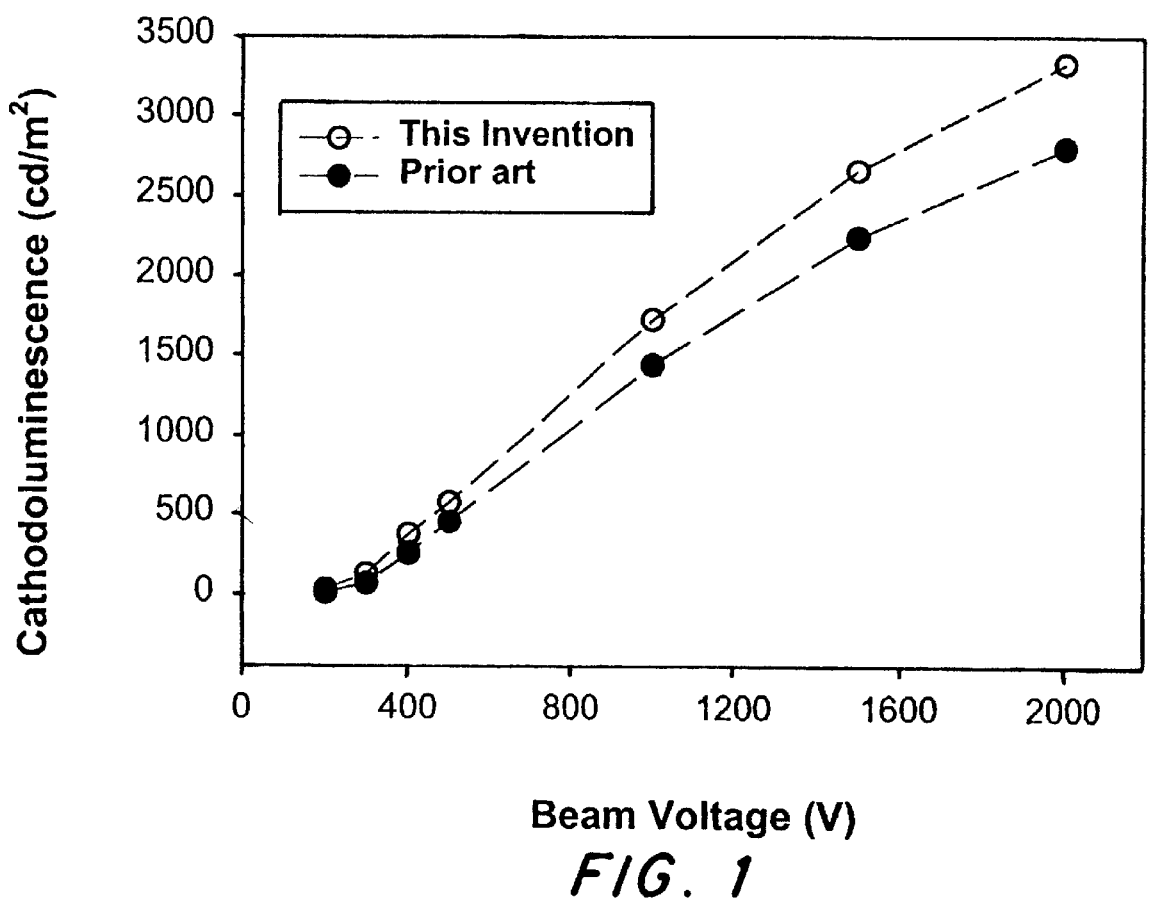
FIG. 1 is a graph which shows the relationship between cathodoluminescence brightness (candelas per square meter, $cd/m^2$) and beam voltage (V) for a phosphor prepared according to the present method (○) and a commercially available phosphor (●)

Thus, in a first embodiment, the present invention provides a new method for preparing phosphors, involving the following steps:

(1) forming a solution or slurry which contains nanosized particles of the phosphor precursors (2) drying the solution or slurry, to obtain a residue; and (3) firing the residue, provides phosphors which exhibit an improved efficiency.

The present method is useful for preparing all types of phosphors. Phosphors which may be prepared by the present method primarily include, but are not limited to, the silicate family, e.g., $Y_2SiO_5$:M (M=metal ions), $ZnSiO_4$:M, $CaMgSiO_4$:M, $CaSrSiO_4$:M, —$SrBaSiO_4$:M, and $Ba_2SiO_4$:M; the aluminate family, e.g., $Y_3Al_5O_{12}$:M, and $BaAl_{11}O_{19}$:M; the borate family, e.g., $SrB_4O_7$:RE and (—Y, Gd)$BO_3$:M; and the niobate and vanadate families, where useful metal ions include but are not limited to divalent metal ions such as Mn and rare earth ions such as Eu, Pr, Tb, Tm, and Ce. Accordingly, the precursors contained in the solution or slurry may be any that are useful for forming the desired phosphor. The combination of selected precursors can lead to the production of known display phosphors, as listed in the following Tables, and the precursors listed in the following Tables may suitably be used in the present method.

Red Phosphors

| Precursor I | Precursor II | Dopant | Phosphor |
|---|---|---|---|
| $Y_2O_3$ | $Y_2S_3$ | Eu | $Y_2O_2S$:Eu |
| $Y_2O_3$ | $V_2O_5$ | Eu | $YVO_4$:Eu |
| $Y_2O_3$ | $GdOS_2$ | Eu | $Y/Ga_2O_2S$:Gu |
| $BaCO_3$ | ZnO | Mn | $Ba_2ZnS_3$:Mn |
| $Y_2O_3$ | $SiO_2$ | Pr | $Y_2SiO_5$:Pr |

Green Phosphors

| Precursor I | Precursor II | Precursor III | Dopant | Phosphor |
|---|---|---|---|---|
| $Gd_2O_3$ | $Gd_2S_3$ | | Tb | $Gd_2O_2S$:Tb |
| $La_2O_3$ | $La_2O_3$ | | Tb | $La_2O_2S$:Tb |
| ZnO | | | Zn | ZnO:Zn |
| $Y_2O_3$ | $Al_2O_3$ | GaO | Tb | $Y_3(Al,Ga)_5O_{12}$:Tb |
| $Y_2O_3$ | $Al_2O_3$ | | Tb | $Y_2Al_5O_{12}$:Tb |
| ZnS | CdS | | Cu | ZnCdS:Cu |
| $Y_2O_3$ | GeO | | Pr | $Y_2GeO_5$:Pr |
| $Y_2O_3$ | $Y_2S_3$ | | Pr | —$Y_2O_2S_2$:Pr— |
| ZnO | GaO | | Mn | $ZnGa_2O_4$:Mn |
| ZnO | $SiO_2$ | | Mn | —$ZnSiO_4$:Mn |
| $La_2O_3$ | $LaBr_3$ | | Tb | LaOBr:Tb |
| $Y_2O_3$ | $Al_2O_3$ | | Ce | $Y_3Al_5O_{12}$:Ce |
| $BaSO_4$ | GaS | | Eu | —$BaGa_4S_4$:Eu |
| $SrCO_3$ | $Al_2O_3$ | | Eu | $Sr_{0.9}A_2O_4$:Eu |
| $SrCO_3$ | GaS | | Eu | $SrGaS_4$:Eu |
| $SrCO_3$ | $Al_2O_3$ | GaO | Eu | $SrAl_{0.1}Ga_{1.9}S_4$:Eu |
| $CaCO_3$ | $SrCO_3$ | $SiO_2$ | Eu | $CaSrSiO_4$:Eu |
| $SrCO_3$ | $BaCO_3$ | $SiO_2$ | Eu | $Sr_{1.5}Ba_{1.5}SiO_5$:Eu |
| $Y_2O_3$ | $SiO_2$ | | Tb | $Y_2SiO_5$:Tb |
| BaO | $SiO_2$ | | Eu | —$BaSiO_4$:Eu |
| $Y_2O_3$ | $B_2O_3$ | | Tb | $Y_4B_2O_9$:Tb |

Blue Phosphors

| Precursor I | Precursor II | Precursor III | Dopant | Phosphor |
|---|---|---|---|---|
| ZnS | | | Ag | ZnS:Ag |
| $Y_2O_3$ | $SiO_22$ | | Ce(III) | $Y_2SiO_5$:Ce |
| ZnO | GaO | | | $ZnGa_2O_4$ |
| LiO | MgO | GaO | | $LiMgGa_2O_4$ |
| ZnS | | | Tm | ZnS:Tm |
| $CaCO_3$ | WO | | | $CaWO_4$ |
| Ca | Mg | $SiO_2$ | Ti | —$CaMg(SiO_4)_2$:Ti— |
| $SrCl_2$ | $H_3PO_4$ | | Eu | —$Sr(PO_4)Cl$:Eu— |
| $SrCO_3$ | MgO | $SiO_2$ | Eu | SrMgSiO:Eu |
| $La_2O_3$ | $Gd_2O_3$ | $CeCl_3$ | Tb | (La,Gd)OBr:Ce,Tb |
| $La_2O_3$ | $Al_2O_3$ | GaO | Tm | LaGaAlO:Tm |
| $SrCO_3$ | GaS | | Ce | —$SrGa_2S_4$:Ce— |
| $BaCO_3$ | $Al_2O_3$ | | Eu | —$BaAl_2O_4$:Eu— |
| $Gd_2O_3$ | $SiO_2$ | | Ce | —$GdSi_2O_5$:Ce— |

Preferably, the precursors are in the form of nano-sized particles. By the term nano-sized particles it is meant that the particles have a greatest dimension of 500 nm or less, preferably 200 nm or less, more preferably 100 nm or less, even more preferably 50 nm or less, most preferably 10 nm or less. Thus, the nano-sized particles will typically have an average particle size of 1 to 500 nm, preferably 2 to 200 nm, more preferably 2 to 100 nm, even more preferably 2 to 50 nm, most preferably 3 to 10 nm. The nano-sized particles of the precursor will also preferably have a uniform size distribution, which in the context of the present invention means=10% or less.

The dopant can be in the form of a molecular precursor such as europium acetate. It should also be understood that the acetate precursors can be replaced by a wide spectrum of carbonates, carbonates and oxygen-coordinating chelating agents. In a particularly preferred embodiment, the phosphor is an orthosilicate-based phosphor, and Aerosil®available from Degussa Co. is used as the $SiO_2$ precursor.

In many cases, the phosphor precursors are commercially available. Many of the phosphor precursors are commercially available as nanosized particles.

However, in other cases, nanosized particles of the phosphor precursor may not be commercially available. In such case, it is necessary to produce the nano-sized particles of the precursor.

As noted above, the present method involves forming a solution or slurry of the phosphor precursors. Suitably, the solvent used to form the solution or slurry of the phosphor precursors is any which will dissolve or suspend the phosphor precursors. Examples of suitable solvents include water, ethanol, n-propanol, i-propanol, and mixtures thereof. Preferred solvents include water and ethanol. The use of aqueous solutions and/or suspensions makes the manufacturing more cost-effective and more environmentally friendly.

Suitably, the phosphor precursors will be present in the solution or slurry in a total solids content of 0.5 wt. % to 30 wt. %, preferably 1 wt. % to 20 wt. %, more preferably 5 wt. % to 10 wt. %. The phosphor precursors are suitably present in the solution or slurry in relative amounts such that the ratio of the various precursors (e.g., Precursor I, Precursor II, Precursor III, etc.) is approximately equal to or equal to their stoichiometric ratios in final desired phosphor.

The solutions or slurries which contain the nano-sized particles of a particular phosphor precursor may be prepared by simply mixing the solvent and the nano-sized particles of a particular phosphor precursor in the appoprate amounts.

In addition, although not necessary, it is possible to filter or decant the solution of phosphor precursors prior to the firing step.

In a preferred embodiment. separate solutions and/or slurries are formed for each different phosphor precursor and then the separate solutions and/or slurries are mixed. In this case, it is possible to use different solvents for the different solutions and/or slurries. However, it is preferred that all solvents used to prepare the solutions and/or slurries be miscible at least in the ratio which will result when the solutions and/or slurries are combined. In addition, it should be understood that the concentration of a first phosphor precursor in its solution or slurry can be varied independently of the concentration of a second phosphor precursor in its solution or slurry, because the total solids content and the ratio of the precursors in the final solution or slurry may be controlled at least in part by adjusting the relative amounts of the two (or more) solutions and/or slurries that are mixed together.

The mixing of the solutions and/or slurries of the phosphor precursors may be accomplished by any suitable technique, including ultrasonicating, stirring, shaking, vortexing, etc. In addition, although not necessary, it is possible to filter or decant one or more of the solutions of phosphor precursors prior to the mixing of the separate solutions and/or slurries.

In particularly preferred embodiment, the solution or slurry which contains the phosphor precursors is sonicated prior to firing. Suitably, the solution or slurry which contains the phosphor precursors is sonicated until it appears to be well mixed by visual inspection. The sonication of the solution or slurry which contains the phosphor precursors may be carried out with any conventional sonication apparatus, such as Fisher Scientific Model FS20. In the context of the present method, good results have been achieved by sonicating 20 mls of a slurry of zinc oxide and silica in ethanol for a time of 10 to 30 minutes in a 2 liter well with the same sonicator mentioned above at a power setting of 200 watts.

After the solution or slurry which contains the phosphor precursors has been prepared and optionally sonicated, the solution or slurry which contains the phosphor precursors is then dried, to obtain a residue. The drying of the solution or slurry may be carried out in any suitable apparatus. Suitable apparatus includes an autoclave, electric oven, and a muffle furnace. In the context of the present invention, good results have been achieved by using Napco Model 5831 vacuum oven Suitably, the drying is carried out for about 10 hours at 85° C. Typically, the drying will be carried out at a temperature of slightly above the boiling point of the solvent used.

In a preferred embodiment a flux material is added to the residue obtained from drying the solution or slurry of the nanosized phosphor precursors. Suitable flux materials include barium chloride, sodium carbonate, sodium fluoride, barium fluoride and potassium chloride. Suitably, the flux material is added to the residue in an amount of 1 to 10 wt. %, preferably about 5 wt. %, based on the dry weight of the residue. It is preferred that the flux material be intimately mixed with phosphor precursors.

The residue is then fired, to obtain the desired phosphor. The exact time and temperature at which the solution or slurry which contains the phosphor precursors is fired will depend on the exact identity of the phosphor being prepared. The firing of the solution or slurry which contains the phosphor precursors may be carried out in any suitable firing apparatus, such as a muffle furnace, tube furnace, and rotating furnace. A preferred firing apparatus is Napco Model 5831 vacuum oven. For large scale production, firing can be conducted by using a rotating stove.

It may be preferred to carry out the firing in one or two or more steps. In the context of the present invention, good results have been achieved by firing a slurry containing 5.7 grams of ZnO, $SiO_2$, and $Mn(OAc)_2$ in ethanol for a time of 3 hours at a temperature of 450° C. followed by firing for a time of 30 minutes at a temperature of 1100° C.

Suitably, the phosphor is ground to a particle size of 1 to 500 nm, preferably 20 to 200 nm. The grinding may be carried out with any suitable apparatus, such as a ball mill, sand mill, mortar and pestle, etc.

In another embodiment, the present invention provides devices which contain such phosphors. Such devices contain:

(1) a support which is coated with the phosphor; and
(2) an energy source which is capable of directing, to the phosphor, energy sufficient to cause the phosphor to luminesce.

Suitable supports include conducting glass (e.g., indium tin oxide coated glass), silicon wafers, semiconductors, metal plates, etc.

Suitable energy sources include electron guns, field emitters (edge, tip, and other forms), UV light sources, and x-rays. Preferred energy sources include electron guns and field emitters.

Such devices may take the form of CRT, FED, and PDP display screens, detectors, scintillators, dosimeters, lamps, and EL displays. In a preferred embodiment, the device is a CRT, FED, and PDP. Such devices are described in *Phosphor Handbook*, edited under the auspices of the Phosphor Research Society, editors Shigeo Shionoya & William M. Yen, (CRC Press, 1998), which is incorporated herein by reference.

Figure 2:
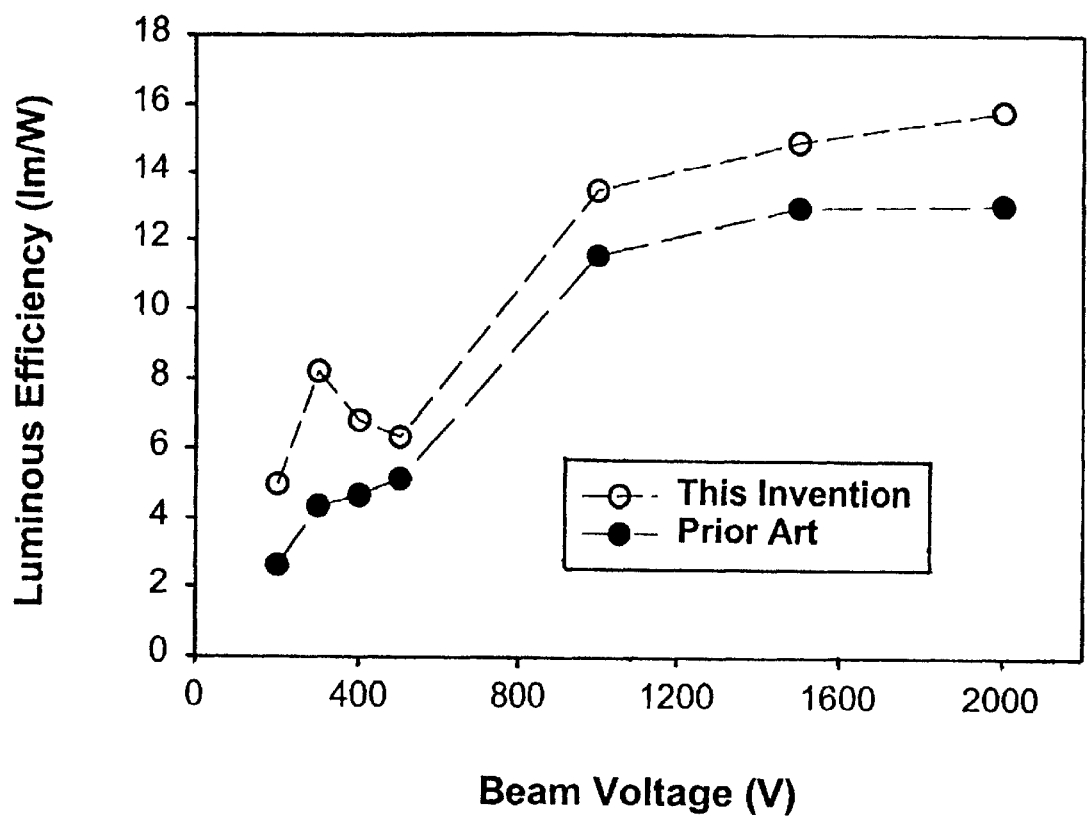
FIG. 2 is a graph which shows the relationship between luminous efficiency (lumens per watt, 1 m/watt) and beam voltage (V) for a phosphor prepared according to the present method (○) and a commercially available phosphor (●).

Thus, the present invention provides a novel preparative route for manufacturing phosphors with high performance at low acceleration voltage. One paramount advantage of the phosphors afforded by the present invention over conventional phosphors is the high performance of the phosphors afforded by the present invention. For example, the manganese-doped zinc orthosilicate phosphor obtained according to the present method has been shown to outperform the commercially available phosphor of the same nominal composition in terms of lumenous efficiency (lumens per watt, lm/watt), i.e., the efficiency of the commercial $Zn_2SiO_4$:Mn (GT95G16, RCA 33-W-2T) is 5.12 lm/watt at 500 V, whereas the efficiency of the phosphor of the same nominal composition prepared by the present method is 6.48 lm/watt at 500 V, and 6.84 at 400 V, respectively (see FIG. 2). Additional advantages of the present method are:

(1) it permits the large-scale preparation of nanostructured phosphors (with robust glassy nanostructures);
(2) it provides a relatively low temperature processing of phosphors, including orthosilicate-based phosphors;
(3) it involves only environmentally benign ingredients and end products;
(4) it allows easy doping of the activators (metal ion dopants);
(5) it uses defect-free nanocrystalline precursors; and
(6) it produces nano-scale phosphor particles.

In addition, the use of nanocrystals and other nanosized grains as precursors ensures a homogeneous distribution of activator precursors in the matrix due to a nearly molecular level proximity between the two precursors. This enables the elimination of dead portions by engineering the admixed dispersion of the nanoprecursors. Furthermore, the size of the primary particles of the resulting phosphors will be in nanometer regime, applicable to high resolution display.

By adopting the approaches of the present invention, a large variety of nanostructured phosphors can be manufactured. These primarily include, but are not limited to the silicate family, e.g., $Y_2SiO_5$:RE (RE=rare earth metal ions), $CaMgSiO_4$:RE, $CaSrSiO_4$:RE, $SrBaSiO_5$:RE, and $Ba_2SiO_4$:RE; the aluminate family, e.g., $Y_3Al_5O_{12}$:RE, and $BaAl_{11}O_{19}$:RE; the borate family, e.g., $SrB_4O_7$:RE and $(Y,Gd)BO_2$:RE; and the niobate and vanadate families.

In the present method, the production of the nanocrystal precursors in kilogram-scale, the effective firing and fine grinding are possible. Special equipment may be necessary for fine grinding in large scale.

Other features of the invention will become apparent in the course of the following descriptions of exemplary embodiments which are given for illustration of the invention and are not intended to be limiting thereof.

EXAMPLES

In the following examples, and throughout this specification, all parts and percentages are by weight, and all temperatures are in degrees Celsius, unless expressly stated to be otherwise. Where the solids content of a dispersion or solution is reported, it expresses the weight of solids based on the total weight of the dispersion or solution, respectively. Where a molecular weight is specified, it is the molecular weight range ascribed to the product by the commercial supplier, which is identified. Generally this is believed to be weight average molecular weight.

Example I $Zn_2SiO_4$:Mn (1) Produce Zinc Oxide Nanoparticles as Alcosol:

A 0.58 wt. % ethanolic suspension of a zinc precursor, zinc acetate anhydrous (99.99%, Aldrich) was refluxed for 3 hours under ambient air conditions at 57–63° C., and the resulting opaque suspension was cooled down to room temperature. At this stage, zinc alkoxide is expected to be the dominant species although some coordination of acetates to zinc is inevitable. One step hydrolysis was conducted by dropwise addition of an organic base, tetramethylammonium hydroxide, TMAH (25 wt. % stock solution in methanol, Aldrich), to the alkoxide suspension under rigorous stirring. Subsequent concentration was performed on a rotary evaporator to yield 2.0 M ZnO nanoclusters. This sample has been stable for 3 weeks, and can be resuspended in ethanol. Analysis data: UV-vis, excitonic peak at 325 nm. absorption onset at 355 nm. Photo-luminescence (PL): emission at 545 nm, excitation: sharp peak at 360 nm.

(2) Introduce Metal Ions Dopants in the Zinc Oxide Particles as Alcosol:

As an example, a mixture of zinc oxide and Mn(II) or Cu(II) precursor (e.g., manganese(II) acetate, 99.99%, Aldrich) was suspended in ethanol under reflux condition established in step (1), to obtain a suspension which was 1 wt. % in Zn. The amount of Mn or Cu being in the range of 1–4% with respect to weight of Zn. The ratio between zinc and dopant ions can be adjusted in a large range since the precursors used are readily suspendable in ethanol. After the mixed alkoxide was cooled down to room temperature, it was hydrolyzed by adding TMAH. Concentration and resuspension of the resulting sol were checked to be reversible by absorption spectrometry. Analysis data: ZnO/Mn (1/0.01), UV-vis: peak at 290 nm, absorption onset: 330 nm. PL:

emission peak at 545 nm with wide shoulders at 570 and 585 nm, excitation sharp peak at 358 nm. ZnO/Cu (1/0.01), UV-vis: peak at 330 nm, absorption onset: 360 nm, PL: emission, 540 nm, excitation sharp peak at 360 nm.

(3) Mix the Zinc Oxide Precursors with Silica Precursor:

150 Grams of Aerosil ($SiO_2$, 7 nm in diameter, Degussa Corporation) was introduced into the above-made zinc oxide (or metal-ion-doped zinc oxide) alcosol to form a syrupy suspension of the two precursors. The dispersion was then ultrasonicated in a bath at 50° C. for 20 minutes, followed by cooling down to room temperature and drying at 120° C. overnight to form mixed gel.

(4) Pre-fire, Cool and Grind the Mixed Gel:

The mixed gel was put in a muffle furnace at room temperature. Then the temperature was increased to 450° C. in 40 minutes, followed by the maintenance of the temperature for 20 minutes in air. The fired material was then taken out of the furnace at this stage. After it was cooled down to room temperature, the cake was ground with a mortar and a pestle. The ground powder was put in a quartz pot and was placed back into the furnace which is at 450° C.

(5) Complete the Firing:

The firing was completed by raising the furnace temperature up to 880° C. in one hour, and by maintaining the elevated temperature for 30 minutes in air. Following this operation, the temperature was lowered to room temperature in 30 hours.

Control of the stoichiometric composition and the calcination of the materials significantly improved the phosphor performance. The stoichiometry, in accordance of the formula $(Zn_2SiO_4)_x \cdot (SiO_2)_y$:M, can be adjusted by varying the ratio between the amount of zinc oxide particles and that of aerosil particles. The concentration of the dopant metal ions can be optimized to obtain the best efficiency of luminescence, either cathodo- or photo-excited.

cooled to room temperature. Hydrolysis was conducted by dropwise addition of 15 mL tetramethylammonium hydroxide, TMAH (25 wt. % stock solution in methanol, Aldrich), to the alkoxide suspension under rigorous stirring. Subsequent concentration was performed on a rotary evaporator to yield a 0.1 M $Y_2O_3$:Ce (Ce, 2%) slurry. This sample has been stable for weeks and can be resuspended in 2-propanol. Analysis data: particle size by TEM ranges from 5 to 10 nm.

(2) Mix the obtained $Y_2O_3$:Ce nanoparticles with equimolar $SiO_2$ nanoparticles and flux material ($BaF_2$) in its stock slurry followed by 20 minutes ultrasonication at 50° C.:

(3) Dry and Prefire the Obtained Mixed Gel:

Put the obtained mixed gel in muffle stove set at 150° C. overnight. Grind the dried cake and place the obtained powder in the stove set at 500° C. for 2 hours.

(4) Firing of the Obtained Powder:

Raise the set temperature of the stove to 1300° C. and maintain that temperature for about 20 to 40 minutes. This firing should be done in air ambient.

(5) Grind the Obtained Powder with a Mortar and Pestle.

(6) Firing the Obtained Powder:

Raise the set temperature of the stove to 1300° C. and maintain that temperature for about 20 to 40 minutes. This firing should be done in air.

Cathodoluminescence, measured at a beam voltage of 100–2,000 volts, was monitored using a Minolta CS-1000 spectroradiometer and processed with ND filter compensation and wavelength calibration. The sample was made as powder film of 1 mm thick on an ITO coated glass plate. The chromaticity parameters (CIE 1931) were determined to be x=0.2218; y=0.6909 for $Zn_2SiO_4$:Mn, and to be x=0.1668; y=0.1003 for $Y_2SiO_5$:Ce. The luminance and luminous efficiency are plotted against beam voltage in FIGS. 1 and 2.

Example III
Effect of Flux Material Summary of the Synthesized —$Y_2SiO_5$:C—

| Lot # | —$Y_2O_3$/SiO— | Anneal time | Flux | Ce % | Lv (cd/m2) | Chromaticity (x,y) |
|---|---|---|---|---|---|---|
| 1-5 | 1/1 | 1400 (2.5 h) | none | 2% | 50 | 0.1697, 0.0950 |
| 12-9 | 1/1 | 1400 (3 h) | none | 2% | 30 | 0.1714, 0.1077 |
| 1-19-1 | 1/1 | 1400 (3 h) | —$BaCl_2$— | 2% | 45 | 0.1680, 0.0870 |
| 1-19-2 | 1/1 | 1400 (3 h) | —$Na_2CO$— | 2% | 76 | 0.1699, 0.1024 |
| 1-24-1 | 1/1 | 1100 (1 h)-1400 (3 h) | none | 2% | 84 | 0.1706, 0.1068 |
| 1-24-2 | 1/1 | 1100 (1 h)-1400 (3 h) | NaF2 | 2% | 68 | 0.1709, 0.1090 |
| 1-29-1 | 1/1.3 | 1100 (1 h)-1400 (1 h) | BaF2 | 2.6% | 42 | 0.1619, 0.0214 |
| 1-29-2 | 1/1.3 | 1100 (1 h)-1400 (1 h) | KCl | 2.3% | 28 | 0.1623, 0.0276 |
| OS Std. | — | — | — | — | 115 | 0.1626, 0.0570 |

Example II
$Y_2SiO_5$:Ce (1) Prepare Cerium-doped $Y_2O_3$ Nanocrystals:

An yttrium precursor, yttrium (III) acetate anhydrous (5.32 gram, 99.9%, Aldrich), and a cerium precursor, cerium (III) acetate (0.127 gram, 99.9%, Aldrich) were refluxed in 200 mL of 2-propanol for 3 hours under ambient air conditions at 90° C. The resulting opaque suspension was Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed:

1. A method for preparing nanoscale phosphor powder comprising the steps of:

forming a solution or slurry which comprises phosphor precursors;

and firing said solution or slurry which comprises the phosphor precursors, wherein said forming a solution or slurry which contains phosphor precursors comprises preparing a first solution or suspension which comprises a metal-ion-doped nanocrystal as a first precursor and mixing said first solution or suspension with a second solution or suspension comprising silica particles as second precursor, to obtain a homogeneous gel.

2. The method of claim 1, wherein said silica particles and said first precursor have an average particle size of less than 500 nm.

3. The method of claim 2 wherein said silica particles and said first precursor have an average particle size of 1 to 300 nm.

4. The method of claim 2 wherein said silica particles and said first precursor have an average particle size of 2 to 10 nm.

5. The method of claim 1, further comprising sonicating said solution or slurry which comprises the phosphor precursors prior to said firing.

* * * * *

UNITED STATES PATENT AND TRADEMARK OFFICE
CERTIFICATE OF CORRECTION

| | | |
|---|---|---|
| PATENT NO. | : 6,576,156 B1 | Page 1 of 1 |
| DATED | : June 10, 2003 | |
| INVENTOR(S) | : Banahalli R. Ratna, Anthony Dinsmore and Yongchi Tian | |

It is certified that error appears in the above-identified patent and that said Letters Patent is hereby corrected as shown below:

<u>Title page,</u>
Item [75], Inventors, include the following name:
-- Syed B. Qadri --.

Signed and Sealed this

Thirtieth Day of December, 2003

JAMES E. ROGAN
*Director of the United States Patent and Trademark Office*